July 1, 1941.　　H. SCHREIBER　　2,247,734

CONTAINER SAFETY DEVICE

Filed Nov. 11, 1937

INVENTOR
Henry Schreiber
BY
John W. Armbruster
ATTORNEY

Patented July 1, 1941

2,247,734

UNITED STATES PATENT OFFICE 2,247,734

CONTAINER SAFETY DEVICE

Henry Schreiber, Woodside, N. Y., assignor, by mesne assignments, to Safety Devices Corporation, New York, N. Y.

Application November 11, 1937, Serial No. 173,965

10 Claims. (Cl. 220—44)

This invention relates to improvements in pressure venting and fire baffling devices for use on containers or tanks of inflammable and volatile material to prevent fire and explosion.

An object of the present invention is the provision of a pressure release valve with a valve stem in the form of a perforated sleeve in the open end of which a closing spring and stop link may be assembled.

Another object of the invention is to provide a self-contained release valve seat and valve which are insertible as a unit in the body of a container or the closure cap of a container. The insertible valve seat is in the form of a cylinder which is capped at one end by a valve head, and in which there slides a sleevelike valve stem within which is a closing spring and a movement limiting stop.

A further object of the invention is the provision of foraminous fire confining baffle tubes which are connected to a holder making them readily attached to, and removable from various sized filler opening fittings of automobile tanks or other containers.

A further object of the invention is the provision of leaf spring clips near the top of foraminous tubes which are flanged to engage the edge of a container opening. When the tubes are inserted, the clips spring out to lock under the opening to hold the tubes in place.

It is a still further object of the invention to provide fire and explosion preventing devices of such an inexpensive design that they may be used freely in all dangerous situations involving containers of inflammable material, no matter how small or cheap the container. As an example of the inexpensive safety construction, foraminous tubes may be connected to a thin tube formed with helical threads adapted to be threaded in the inside of the threaded neck opening of the common gallon can. The cap fitting over the outside of the same neck may be punctured to receive the readily assembled pressure release valve of the present invention.

A feature of the invention is the construction of a pressure valve around a flexible washer in the center of which the valve stem sleeve is spread and over the outside of which a valve cap is clamped.

Another feature of the novel construction of the tube holder is the formation thereon of locking faces for receiving and holding a tank cap.

Other objects, features and their advantages will appear from a reading of the following description which describes, among other things, many novel features of construction and novel combinations of parts present in the different embodiments of the invention shown in the accompanying drawing.

Figure 1:
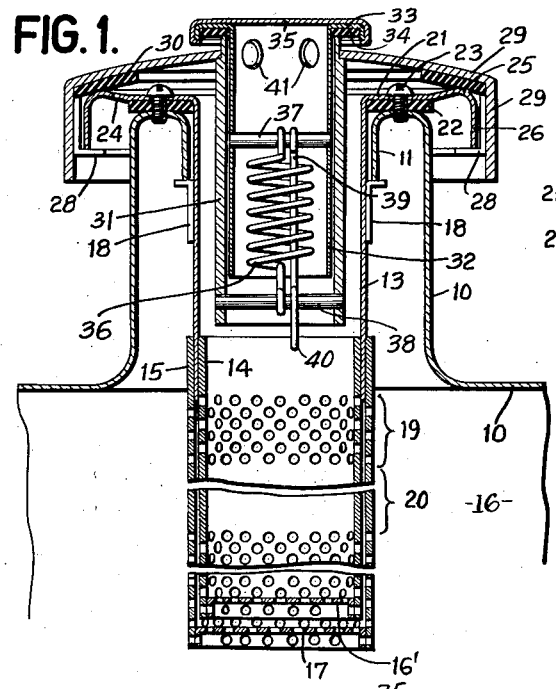
Fig. 1 is a sectional elevation view of the pressure release valve and foraminous tubes assembled in an automobile tank opening, in accordance with one embodiment of the present invention.
Figure 2:
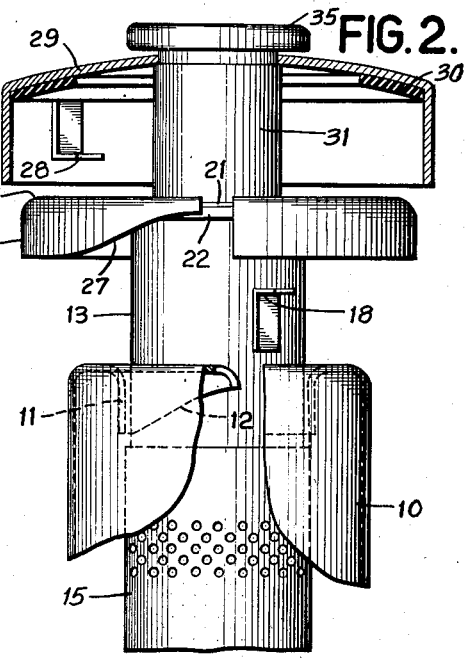
Fig. 2 is a side elevation view, partly in section and partly perspective, of the embodiment shown in Fig. 1 with many parts arranged in extended positions.

Referring to Figs. 1 and 2 it is noted that the round neck 10 of a tank 16 such as an automobile gas tank is provided with an inwardly turned flange 11 part of which is cut away and curved as at 12, Fig. 2, to form the usual locking groove for the cap. In the present construction this locking groove is not used to hold the cap on the tank, but instead it is to secure a tubular holder 13 on which there is mounted a pair of welded or riveted lugs 18 engaging under the flange 11. On the holder is secured a pair of foraminous tubes 14 and 15 which extend down into the tank 16. The tubes 14 and 15 are concentrically arranged, one secured to the inside of the holder 13 and the other attached to the outside of the end of the holder by solder, rivets or any other connecting agency. Bottom plates 16' and 17 are connected to the lower ends of the tubes to catch any sediment that may enter when filling the tank and also to complete the foraminous fire stopping wall. The upper part of the tubes is perforated with flame proof aperture as at 19, below which there is a short blank space 20 followed by a perforated area all the way to the bottom. When filling the tank the upper perforated area 19 allows air and gas to escape from the tank around the filler pipe so that an overflow does not result.

The upper part of holder 13 is flared out into a widened horizontal annular ring 21 under which a washer 22 of rubber, cork or other yielding material, acts as a seal. If it is desired to make a fixed permanent attachment of holder 13, screws 23 may be placed in holes in ring 21 and washer 22 and threaded into tapped holes in the top of flange 11.

A small hole 24 is cut in the ring 21 to prevent a partial vacuum being formed at the top of the tank when the gas is fed to the motor.

The holder 13 is enlarged beyond the ring 21 by the formation of a raised circumferential bead 25 which leads into a descending circumferential flange 26.

It is contemplated that the holder 13 may be made up of two connected parts, a plain tube 13 and connected thereto a separate upper cup formation including ring 21, bead 25 and flange 26.

Bead 25 is notched at opposite sides of the holder and flange 26 is also cut away to form curved locking faces 27, Fig. 2, into which may be threaded a pair of lugs 28 attached to the inner wall of a cap 29. A washer is placed in the cap to press against the top of bead 25 and hold the horizontal part of lug 28 firm against the bottom edge of flange 26.

In the center of cap 29 is cut a circular hole into which is forced a shouldered cylinder 31 that acts as a valve seat and valve guide for a pressure release unit assembled on the cap. Within the cylinder 31 there slides a sleeve 32 which is the stem of a valve formed by extending the upper end of the sleeve out into an annular cupped ring 33 holding a washer 34 over the top part of cylinder 31 extended above the upper surface of cap 29. A cover 35 is placed over the top of sleeve 32 and ring 33 and is curved under the ring to be secured thereto.

This cover completes the head of the valve by closing the top end of the sleeve.

Within the sleeve 32 is a tension spring 36 that keeps the valve closed and by its dimensions determines the amount of pressure needed to open the valve. The upper end of the spring is caught on a rod 37 extending across the sleeve 32 and the lower end of the spring is looped around another rod 38 secured across cylinder 31 near the lower end. The spring is normally under tension and both rods are notched to hold it centralized within the valve stem 32. Encircling the rod 37 is the top end of a wire link or stop member 39 formed with an open loop 40 passing around and beneath the rod 38. This link 39 is confined within the coils of spring 36 so that it cannot slip out of a substantially vertical position between the rods. The lower loop 40 is proportioned to allow the valve to rise just far enough so that the compressed gas or air may escape through a series of holes 41 cut in the side of sleeve 32 near the top of the valve. It is contemplated that four equally spaced holes 41 may be provided in sleeve 32 so that they may be drilled out in two drilling operations.

The stop link 39 is provided to prevent the spring 36 from being overextended when the valve head is grasped and lifted by hand.

It may be pointed out that the entire valve unit including the valve seat is a self contained structure readily insertible in any place desired. All that is necessary is to drill a slightly undersized hole in the pressure relief position, then force the cylinder in the hole up to the shoulder and then assemble the valve parts in the cylinder.

Figure 6:
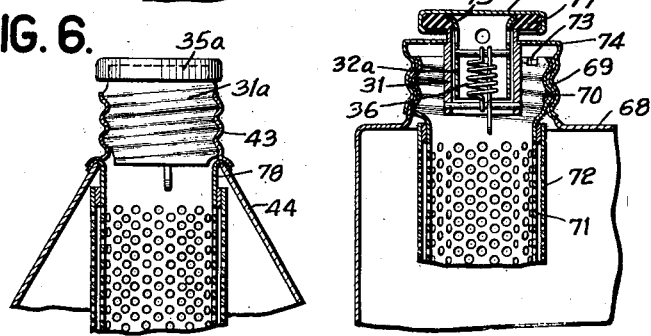
Figure 7:
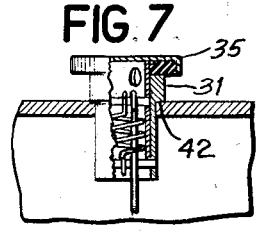
Fig. 7 is a detail view of a valve unit in accordance with the invention shouldered for insertion from the outside of a container.

In Fig. 7 it is shown that cylinder 31 may be formed with a downwardly facing shoulder 42 adapting the unit for insertion from the outside of any part of a container. It is evident that the outside of cylinder 31 may be threaded and fitted into a tapped part of a container just as the thin cylinder 31a (Fig. 6) is formed with a helical thread fitted into the threaded pouring nozzle 43 of a can 44.

With both the pressure release valve and the foraminous tubes on a container, complete control over fire and explosion is insured. The valve prevents explosion by releasing the gases which are compressed by impact or by heat near the tank. And the foraminous tubes will perform, in a well known manner, the function of a safety device which prevents gases or vapors within a container from being ignited by a spark or flame being brought into proximity with the filler opening.

Figure 3:
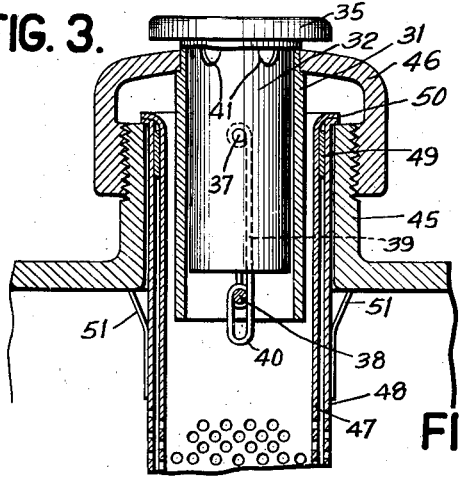
Fig. 3 is a sectional view of another embodiment of the invention showing the novel pressure release valve and spring clip locked foraminous tubes contained within a threaded closure opening.

Fig. 3 disclosed a modified form of construction wherein the safety devices are associated with a tank filling neck 45 and a cap 46 threaded thereon. A pair of foraminous tubes 47 and 48 are placed in the circular neck 45 and are maintained concentric with respect to each other by a collar 49 between the tubes near the top end. The top edges of both tubes are flared out and pinched together or soldered to form an overhanging lip 50. This lip overlaps and engages the top edge of neck 45 to support the tubes and prevent them from falling into the tank. Secured to the side of the outer tube 48, and suitably spaced from the lip, are a series of thin spring clips 51, the upper ends of which are flattened against the tube as it is shoved through the neck, but when lip 50 arrives near the top of neck 45, the ends of clips 51 are free to spring out, as shown and lock under the inside of the neck to hold the tubes in place.

Attached to the cap 46 is the cylinder 31 carrying all the pressure relief valve parts described hereinbefore.

Figure 4:
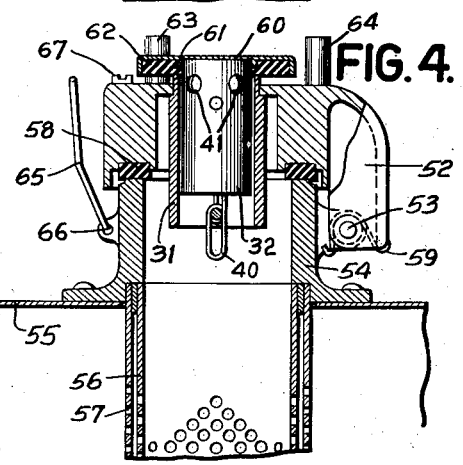
Fig. 4 is a sectional view of a still further embodiment of the invention, wherein the safety device is equipped with a hinged cap.

Fig. 4 shows an embodiment of the invention as applied to a hinged cap 52 pivoted at 53 on the side of a neck standard 54 secured to the top of a container 55. Attached to the bottom of standard 54 are a pair of perforated tubes 56 and 57 as a flame wall protection for the container. A washer is seated in an annular groove around the bottom of cap 52. A coil spring 59 wound around pivot 53 urges cap 52 in a counterclockwise direction to press the washer 58 down on the rim of neck 54. The center of the circular part of the cap is opened to receive the shouldered cylinder 31 carrying the pressure release valve parts. This valve is constructed the same as the valve described in detail with reference to Figs. 1 and 2, with the exception of the valve head construction. The head 60, Fig. 4, is formed in one piece with an annular shoulder 61 the inner edge of which is sized to engage the outside of the upper edge of sleeve 32 with a force fit. Under the valve head 60 is a washer 62 fitted between the shoulder 61 and the outer wall of the head.

Extending from the top of the cap 52 are a plurality of studs 63 and 64 which provide space above the valve head 60 to allow free motion of the valve even though containers may be piled one on top of another. Studs 64 also serve as a means for opening the cap because they are positioned to be operated by a thumb while the fingers grasp a container handle to the right of the cap.

A locking wire loop 65 is pivoted at 66 on the standard 54 and the upper end is adapted to be snapped over the notched lock extension 67 on the top of the cap 52. Even though the hinged cap 52 may be locked down by wire 65 to prevent loss of material from the container, an explosion is prevented at all times when internal pressure gets too high by the openings 41 provided by the valve.

Figure 5:
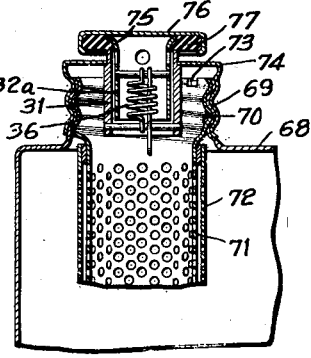
Figs. 5 and 6 are sectional elevation views of the safety devices of the invention incorporated in can openings.

Fig. 5 shows a can portion 68 provided with a pouring spout 69 formed with helical threads. Into this spout is threaded the helical formed end 70 of a foraminous tube 71. Attached to tube 71 is another tube 72, both acting as a flame arrester. The upper edge of end 70 is notched as at 73 to provide a spanner grasping means for threading the tubes into the spout.

A cap 74 is formed with threads to engage over the outside of the threaded spout 69. In this cap is secured the shouldered cylinder 31 carrying the valve parts similar to those described with reference to Figs. 1 and 2, with the exception of the valve head construction. A valve stem sleeve 32a is spread out at the upper end 75 to rest on a washer 77 over which a valve cap 76 is bent to force the washer against the underside of flared end 75.

In the embodiment of Fig. 6, the spout 43 and the tube 78 are soldered to the top of can 44. In order to pour from can 44, the valve 31a need not be removed because when the can is tipped, the pressure on the valve, opens it and allows a flow of liquid through pressure release openings such as holes 41 (Fig. 1). If the valve spring is made strong enough to resist such automatic operation of the valve, the same effect may be had by operating the valve head with a finger as the can is tipped. In this way the pressure release valve of Fig. 6 serves the additional function of controlling the dispensing of the material it protects.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While, in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

Having thus described my invention, I claim:

1. In an explosion preventing device on a container of volatile matter with an opening and a cap therefor formed with an aperture, a unitary pressure relief valve comprising a shouldered cylindrical valve seat with a reduced section above said shoulder fitting in and projecting above the apertured portion of said cap, a sleeve inside said seat with perforated walls near the top of said seat, a valve head on said sleeve extending over the top of said projecting reduced section of said seat with a washer contacting the top of said projecting reduced section, a rod across the inside of the sleeve, another rod across the inside of the bottom of the seat, a spring attached to said rods to hold the head against the seat, and a link attached to one of said rods and formed with a slotted portion encircling the other rod to limit the movement of said sleeve.

2. In a safety device for a container with a hinged cap over a filling and pouring opening, means for locking the cap closed, a cylinder mounted in said cap, a pressure release valve in said cylinder, a valve head on said valve adapted to be raised above said cap and said cylinder, and a series of studs projecting from the top of said cap to protect said valve head from interference with its motion.

3. In an explosion preventing device on a container of volatile material, a valve seat, a valve stem in the form of a perforated sleeve in said seat, a valve head formed with an annular shoulder pressed on the end of said sleeve to assemble the head thereon, a washer between said head and said seat, and means for urging the head in a closed position with respect to said seat.

4. In a pressure release device on a container of volatile matter with an opening and a cap therefor formed with an aperture, a length of standard tubing turned down at one end to form a shoulder and a reduced section which is forcibly fitted into and extending above the aperture in said cap to form a valve seat, a second length of standard tubing fitted loosely inside said first mentioned tubing to form a valve stem, said stem having perforated walls near the top of said seat, a valve head fastened on the top of said stem and extending over the top of said reduced section of said seat, a washer under said head and normally pressed between said head and the top of said reduced section of the seat, a rod across the inside of the valve stem, another rod across the inside of the bottom of the seat, a tension spring attached to said rods to hold the valve head and washer normally against the top of said reduced section, and a wire link encircling one of said rods and formed with a loop around the other of said rods to limit the movement of said valve stem and head.

5. In a pressure release device for a container of volatile material with a hinged cap on a filler opening frame, said cap being formed with an opening, a wire clasp pivoted on said frame and movable over said cap to lock it closed, a short shouldered cylindrical valve seat with a reduced section above said shoulder fitting in and projecting above the opening in said hinged cap, a sleeve inside said seat, said sleeve being perforated with pressure release perforations near the top of said seat, a valve head extending over the top of the reduced section of said seat with an outer annular flange, said head also having an inner annular ring which is forced on said sleeve to attach the head thereto, a washer between said head and the top of said seat, said washer being confined in place by said annular flange and ring, a rod across the inside of the sleeve, another rod across the inside of the bottom of the seat, a tension spring attached to said rods to hold the head washer against the seat, and a link on one of said rods and formed with a slotted portion encircling the other rod to limit the pressure release movement of said sleeve.

6. In an explosion preventing device on a container of volatile matter formed with an aperture, a unitary pressure relief valve comprising a shouldered cylindrical valve seat with a reduced section below said shoulder fitted tightly into said aperture so that a thicker section above the shoulder of said seat extends outside said container, a sleeve inside said seat with perforated walls near the top of said seat, a valve head on said sleeve extending over the top of said extending thicker section of said seat with a washer between said head and the top of said seat, a rod across the inside of the sleeve, another rod across the inside of the bottom of the seat, a spring attached to said rods to hold the head washer against the seat, and a link on one of said rods formed with a slotted portion encircling the other rod to limit the movement of said sleeve.

7. In a pressure release device on a volatile matter container formed with an opening, a length of standard tubing turned down at one end to form a shoulder and a reduced section which is fitted tightly into said opening so that the unturned thicker section of said tubing extends above said opening to form a valve seat, a second length of standard tubing fitted loosely inside said first mentioned tubing to form a hollow valve stem, said stem having perforated walls near the top of said seat, a valve head fastened on the top of said stem tubing and extending over the top of said thicker section of said seat tubing, a washer under said head and normally pressed between said head and the top of said thicker section of the seat, means between said stem and seat for normally urging the valve head and washer against the top of said thicker seat section, and means for limiting the movement of said stem tubing relative to said seat tubing.

8. In an explosion preventing device for a volatile matter container formed with an aperture, a cylindrical formation around said aperture with a portion of the formation projecting out of said container, a pressure release valve with a valve stem in said formation, a head on said valve stem assembled thereon with merely a force fit and overlapping said projecting cylinder portion, means for closing said valve, and a washer between said valve head and said projecting cylinder portion for preventing said matter from leaking out of the container.

9. The combination with a container of volatile matter having an opening, of an explosion preventing device for capping said opening, said device including a first hollow sleeve inserted in said opening and attached to said container, and a second hollow sleeve arranged within said first sleeve, a valve head at the top of said second sleeve closing the upper end of said second sleeve, said second sleeve being longitudinally slidable in said first sleeve in response to pressure on said valve head from within said container for raising said head and second sleeve, resilient means for normally seating said second sleeve within said first sleeve, one of said sleeves having a hole extending through its side wall near the top thereof which is arranged to be normally covered when said second sleeve is seated and uncovered when said second sleeve is raised, whereby pressure from within said container which is sufficient to raise said head against the action of said resilient means may be released through said hole into the outside atmosphere, said device being pivoted on said container to enable access to said opening for filling said container, and means urging said device to close said opening.

10. The combination with a container of volatile matter having an opening, of an explosion preventing device for capping said opening, said device including a first hollow sleeve inserted in said opening and attached to said container, and a second hollow sleeve arranged within said first sleeve, a valve head at the top of said second sleeve closing the upper end of said second sleeve, said valve head having a washer on the underside thereof for normal engagement with the top of said first sleeve, said second sleeve being longitudinally slidable in said first sleeve in response to pressure on said valve head from within said container for raising said head and second sleeve, resilient means for normally seating said second sleeve within said first sleeve, said second sleeve having a hole extending through its side wall near the top thereof which is arranged to be normally covered when said second sleeve is seated and uncovered when said second sleeve is raised, whereby pressure from within said container which is sufficient to raise said head against the action of said resilient means may be released through said hole into the outside atmosphere, said device being pivoted on said container to enable access to said opening for filling said container.

HENRY SCHREIBER.